UNITED STATES PATENT OFFICE.

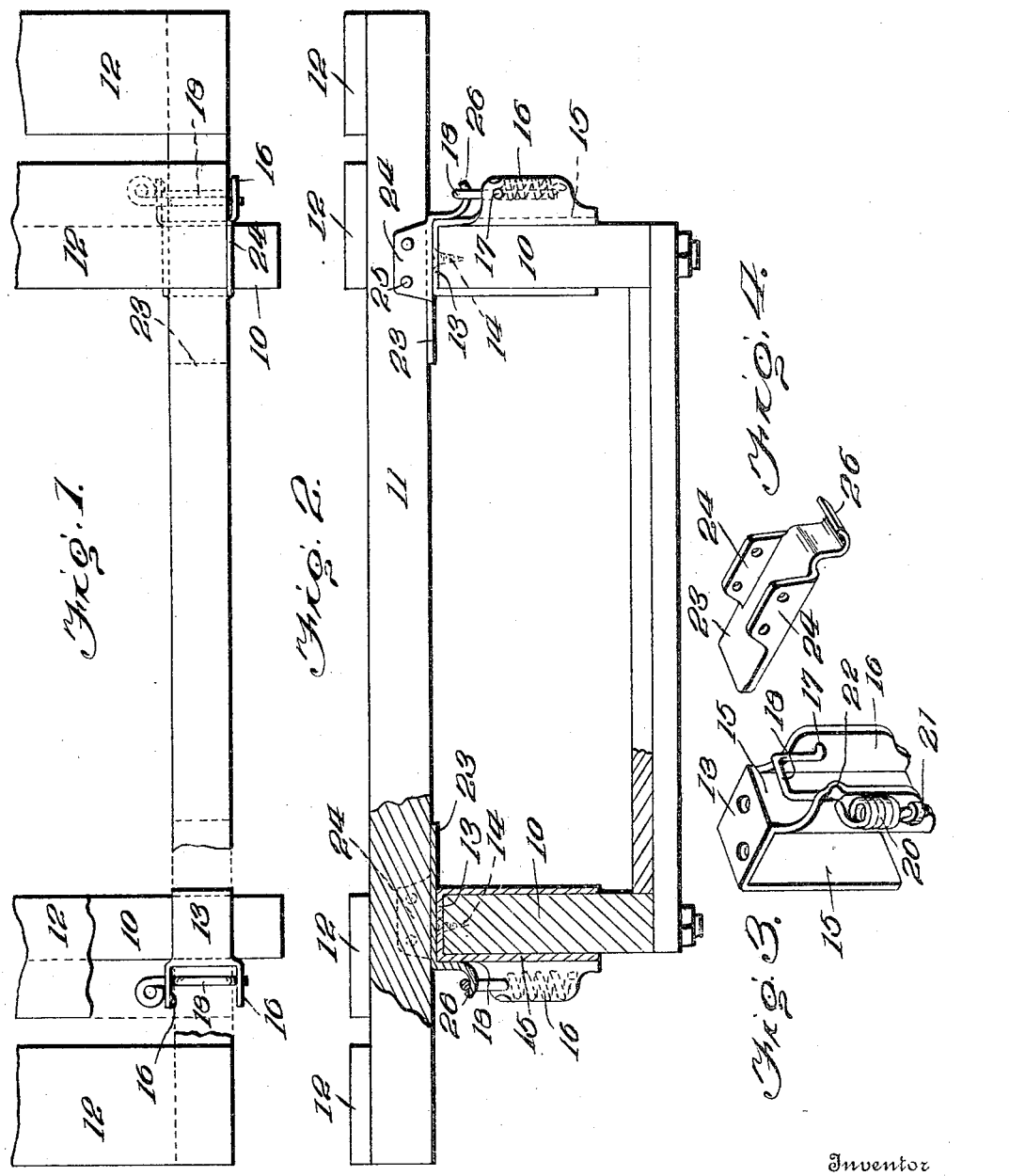

EVERETT R. JACKSON, OF HESPER, NORTH DAKOTA.

VEHICLE BODY-FASTENER.

1,136,532.  Specification of Letters Patent.  Patented Apr. 20, 1915.

Application filed September 3, 1913. Serial No. 787,907.

*To all whom it may concern:*

Be it known that I, EVERETT R. JACKSON, citizen of the United States, residing at Hesper, in the county of Benson and State of North Dakota, have invented certain new and useful Improvements in Vehicle Body-Fasteners, of which the following is a specification.

This invention relates to improvements in vehicle bodies, more particularly to the class of hay racks and similar devices, and has for one of its objects to provide a simply constructed device whereby the parts may be disassociated when not in use, or when the vehicle is to be employed for purposes other than as a hay rack.

Another object of the invention is to provide a simply constructed device which may be applied to hay racks, stock racks, and like vehicles or attachments without material structural change in the vehicle body or in the rack.

Another object of the invention is to provide a simply constructed device whereby the rack members may be quickly assembled by a single person and thereby materially reducing the labor necessary to arrange the rack upon the vehicle body or remove it therefrom.

With these and other objects in view, the invention consists in certain novel features of construction as hereafter shown and described, and then specifically pointed out in the claims.

The improved device may be employed in connection with vehicle bodies of various forms, such as farm wagon boxes, hay racks, stock racks and the like, and it is not desired therefore to limit the invention to use in connection with any specific vehicle, but for the purpose of illustration is shown applied to a conventional hay rack, and in the drawings illustrative of the preferred embodiment of the invention: Figure 1 is a plan view of a portion of a conventional hay rack with the improvement applied; Fig. 2 is a rear elevation, partly in section; Fig. 3 is a detached perspective view of the lower member of the fastening device; Fig. 4 is a perspective view of one of the upper members of the fastening device.

Corresponding and like parts are referred to in the following description and indicated in all the views of the drawings by the same reference characters.

The improved device comprises two main members, one member adapted to be attached to the side members of the body or box of the vehicle and the other member adapted to be attached to the transverse supporting members of the rack. The members are preferably formed of pressed metal and may be slightly changed in form to adapt them to the variations in the thickness or size of the portions of the vehicle or rack to which they are attached.

For the purpose of illustration the improved device is shown applied to a conventional hay rack, the side members of the vehicle body being represented conventionally at 10, the transverse or bearing members of the rack at 11, and the longitudinal "basket" members at 12, these parts being of the usual construction. The members 11 bear upon the upper edges of the members 10 and are generally bolted or otherwise secured thereto, while in the improved device a detachable securing means is provided between the members 10 and 11, and this securing portion constitutes the invention which is the subject-matter of the present application. The member which is attached to the sides 10 comprises a plate 13 bolted or otherwise secured at 14 to the upper edge of the member 10, and is provided with a downwardly directed integral portion 15 which bears against the side faces of the member 10. The depending portion 15 is provided with outwardly directed ears 16 spaced apart. A holding device is connected to the ears 16 and formed of a relatively heavy resilient wire and pivoted at one end at 17 in one of the ears and curved upwardly between the ears to form a loop 18 and extended thence through the other ear 16 as shown at 19, and formed into a coil 20 externally of the ear with the metal of the ear against which the spring is located provided with a cleft to form a clip 21 to receive the lower end of the spring. By this means the spring exerts its force to hold the loop 18 in vertical position and to return it to vertical position when released. The material of one of the ears 16 is bent inwardly as shown at 22 to form an inwardly directed lip projecting into the path of the loop 18, to retain the latter when bent down into substantially horizontal position. The material of the loop will yield sufficiently to permit it to pass the obstruction 22 and be held thereby in horizontal position against the resistance of the spring 20, but will yield and automatically assume its vertical position when a sufficient force is applied to the loop from beneath to overcome the resistance of the material of the loop, the object to be hereafter explained.

The portion of the device which is connected to the member 11, comprises a plate 23 bearing beneath the lower edge of the member 11, and with vertically directed sides 24 bearing against the side faces of the member 11. The member 23—24 is secured to the member 11 by bolts or other suitable fastening devices 25, and the member 23 is provided with a depending hook-like projection 26 which is adapted to engage beneath the loop 18, as shown in Fig. 2. By this simple arrangement it will be obvious that the members 11 together with the attached "basket" members or rails 12, may be located upon the members 10 with the plates 23 bearing upon the plates 13, with the projections 26 disposed beneath the loops 18 and thus form an efficient securing means between the hay-supporting portion of the device and the body of the vehicle. The springs 20 will be of sufficient strength to prevent accidental displacement of the loops, while at the same time the parts may be uncoupled by simply manually releasing the loops by drawing them outwardly against the resistance of the springs and engaging them with the holding projections 22. The loops 18 are left in engagement with the holding projections 22 and out of the way of the portions 26 of the members 23 to facilitate the replacing of the upper portion 11—12 of the frame, and after the upper portion is so replaced it is only necessary to throw the loops upwardly to complete the coupling of the parts, the parts 18—26 being sufficiently yieldable to permit the member 18 to be forced into engagement with the member 26.

The improved device is simple in construction, can be inexpensively manufactured and applied without material structural change to racks or supports of various kinds and forms and employed for various purposes. By this simple means the rack may be readily and quickly applied to or detached from the body of the vehicle without detaching any of the parts.

Having thus described the invention, what is claimed as new is:

1. A device of the class described comprising a member adapted to be attached to a support and including spaced ears, a loop pivoted by its terminals in said ears and with one terminal extended into a spring and connected to one of said ears, and another member adapted to be attached to a support and including a terminal hook adapted to engage said loop.

2. A device of the class described comprising a member adapted to be attached to a support and including spaced ears, one of said ears having an inwardly directed lip, a loop pivoted by its terminals in said ears and with one terminal extended into a spring and connected to one of said ears, said loop adapted to be engaged by said lip to hold the same in open position.

3. A device of the class described comprising coacting members adapted to be attached respectively to a stationary and a movable portion of a vehicle, one of said members having a projection and the other member having an inwardly directed lip, a holding member including a loop pivoted at its ends to the other member and extending into the path of said projection and adapted to be engaged by said lip when in one position, and a spring associated with said loop and operating to hold the same yieldably in engagement with the projection.

4. A device of the class described comprising coacting members adapted to be attached respectively to a stationary and a movable portion of a vehicle, one of said members having lateral ears spaced apart and the other member having a projection, a holding device including a loop extending between said ears and pivoted therein and extending into the path of said projection, and means for maintaining said loop in yieldable engagement with said projection.

In testimony whereof I affix my signature in presence of two witnesses.

EVERETT R. JACKSON. [L. S.]

Witnesses:
J. I. HEGGE,
E. A. NELSON.